US006389435B1

(12) United States Patent
Golovchinsky et al.

(10) Patent No.: US 6,389,435 B1
(45) Date of Patent: May 14, 2002

(54) METHOD AND SYSTEM FOR COPYING A FREEFORM DIGITAL INK MARK ON AN OBJECT TO A RELATED OBJECT

(75) Inventors: Gene Golovchinsky; Morgan N Price, both of Palo Alto; William N Schilit, Menlo Park, all of CA (US)

(73) Assignees: Fuji Xerox, Co, Ltd., Tokyo (JP); Xerox Corporation, Stamford, CT (US)

( * ) Notice: Subject to any disclaimer, the term of this patent is extended or adjusted under 35 U.S.C. 154(b) by 0 days.

(21) Appl. No.: 09/244,768

(22) Filed: Feb. 5, 1999

(51) Int. Cl.$^7$ ................................. G06F 17/21
(52) U.S. Cl. ................ 707/512; 707/541; 345/764; 345/776; 345/838; 345/864
(58) Field of Search ................ 707/512, 541, 707/3–6, 501.1; 345/764, 776, 838, 863, 864

(56) References Cited

U.S. PATENT DOCUMENTS

| | | | | |
|---|---|---|---|---|
| 5,513,305 A | * | 4/1996 | Maghbouleh | 707/500 |
| 5,822,539 A | * | 10/1998 | Van Hoff | 709/236 |
| 5,838,819 A | * | 11/1998 | Ruedisueli et al. | 345/179 |
| 6,085,185 A | * | 7/2000 | Matsuzawa et al. | 707/2 |
| 6,151,021 A | * | 11/2000 | Berquist et al. | 345/764 |
| 6,173,287 B1 | * | 1/2001 | Eberman et al. | 707/102 |
| 6,311,189 B1 | * | 10/2001 | De Vries et al. | 707/102 |

OTHER PUBLICATIONS

"New CrossPad XP Offers a Lightweight Design . . . ", IBM, <http://www.ibm.com/press/prnews.nsf/crawler/F3C89845 C2D98BAD8525668D00459F32>, Sep. 28, 1998.*

"IBM Pen Technologies", IBM, <http://www.research.ibm-.com/handwriting/>, Jan. 10, 1998.*

Golovchinsky G., What the Query Told the Link: The Integration of Hypertext and Information Retrieval, *Proceedings of Hypertext '97*, ACM Press, pp. 67–74.

Allan, J., "Automatic Hypertext Construction", Cornell University, Jan. 1995.

Schilit, W. et al., "Beyond Paper: Supporting Active Reading with Free Form Digital Ink Annotations", *In Proceedings of CHI '98*, ACM Press, pp. 1–8.

Streitz, N. et al., "DOLPHIN: Integrated Meeting Support Across Local and Remote Desktop Environments and Live-Boards", Integrated Publication and Information Systems Institute, pp. 345–358.

Francik, E., "Rapid, Integrated Design of a Multimedia Communication System", *Pacific Bell*, pp. 36–69.

Landay, J., "Interactive Sketching for the Early Stages of User Interface Design", *School of Computer Science, Carnegie Mellon University*, Dec. 19, 1996.

* cited by examiner

*Primary Examiner*—Joseph H. Feild
(74) *Attorney, Agent, or Firm*—Oliff & Berridge, PLC (57) ABSTRACT

Freeform digital ink marks on an object are copied onto other objects that are related to the object. An embodiment of the invention copies freeform digital ink mark on terms in an index to corresponding instances of those terms in documents upon which the index is based. The instances of the freeform digital ink marks enable a user of the electronic system of the invention to quickly and easily comprehend the organization of a document and to navigate and search a document.

60 Claims, 5 Drawing Sheets

METHOD AND SYSTEM FOR COPYING A FREEFORM DIGITAL INK MARK ON AN OBJECT TO A RELATED OBJECT

BACKGROUND OF THE INVENTION

1. Field of Invention

This invention is directed to an electronic system that supports reading and browsing. In particular, this invention is directed to an electronic system that facilitates navigation from an index to portions of a document or documents that are of interest to the user using freeform digital ink annotations.

2. Description of Related Art

Browsing through documents is an important information exploration activity. It is typically accomplished through hypertext links that take the reader from one page (or concept) to another. Other navigation techniques that support browsing behavior rely on queries to establish connections between information nodes. One such navigation technique is described in *What the Query Told the Link: The Integration of Hypertext and Information Retrieval,* by Golovchinsky G., Proceedings of Hypertext '97, ACM Press, pp. 67–74. These techniques are based upon computing the similarity between passages or documents based on the terms they contain as the user selects portions of those documents. Another approach to supporting navigation based on statistical similarity measures is based on the metaphor of the "back of the book" index.

Traditional "back of the book" indexes are used to locate concepts that are present in the text. It is possible to generate such indexes automatically based upon a combination of statistical and linguistic techniques. Examples of these techniques are described in *The Hypertext Concordance: A Better Back-of-the-Book Index,* by Schuetze H., in Proceedings of Computerm '98, pp 101–104 and in *Automatic Hypertext Construction,* by Allan J., PhD dissertation, Cornell University, January 1995. These indexes can be constructed for a single document or for a collection of documents. They can also be tailored to the interest of particular users.

Conventional indexes do not provide a means for quickly and easily determining which portions of a document may be more relevant than another. Typically, a user selects a term in an index and explores each individual occurrence of that term in the document a single occurrence at a time. Additionally, although the index may provide the passage in which the term is found, the frequency or position of the term in that passage is not conveyed or easily comprehended by the user.

Freeform digital ink annotation systems are known. One freeform digital ink annotation system is described in *Beyond Paper: Supporting Active Reading with Free-form Digital Ink Annotations,* In Proceedings of CHI '98, ACM Press. This system uses freeform digital ink to compute queries using entire sentences or paragraphs that are implicitly selected by the ink. This freeform digital ink annotation system is also described in *Linking BY Inking: Trailblazing in a Paper-Like Hypertext,* by Morgan Price, Gene Golovchinsky and William Schilit, In Proceedings of Hypertext '98, Pittsburgh, Pa., Jun. 20–23, 1998, pp. 30–39, ACM Press. This system enables the creation of links between objects using freeform digital ink annotation.

SUMMARY OF THE INVENTION

An exemplary embodiment of the method and system of this invention facilitates navigation from an index to portions of a document that are of interest to a user using freeform digital ink. A user can mark terms in an index page using freeform digital ink and the freeform digital ink mark is copied to instances of the annotated terms that occur in the document. A user can quickly gain a sense of the distribution of a term within a document. The user can acquire this sense because the freeform digital ink marks are copied throughout the document over each instance of an annotated term. The embodiment provides a view of the document with thumbnail views of individual pages in the document. In this view, the annotations are clearly identifiable even though the underlying text may not be legible. The visual pattern of freeform digital ink marks in the thumbnail images then indicates where terms occur and can assist the user in deciding which portion of a document or documents to read.

Additionally, by making a variety of different types and styles of freeform digital ink marks in the index, the relationships between terms in a document can be more quickly comprehended by a user. The use of freeform digital ink for the marks allows the user to distinguish terms in a document without requiring the user to read the terms in the document. Rather, the user merely has to recognize the mark.

Furthermore, combinations of shapes and colors can be used for the freeform digital ink marks to create a large number of identifiable terms. A set of personalized freeform digital ink marks may also be created and projected onto a new document.

Conventional systems do not treat a user's freeform digital ink mark in a single place, such as an index, as a prototype for marks in other places. While the prototype-instance instantiation mechanism is well known in object-oriented languages, no system has combined freeform digital ink annotations, "back of the book" indexes, and the prototype-instance inheritance model in a single user interface.

BRIEF DESCRIPTION OF THE DRAWINGS

The preferred embodiments of this invention will be described in detail, with reference to the following figures, wherein.

These and other features and advantages of this invention are described in or are apparent from the following detailed description of the preferred embodiments.

DETAILED DESCRIPTION OF PREFERRED EMBODIMENTS

Figure 1:
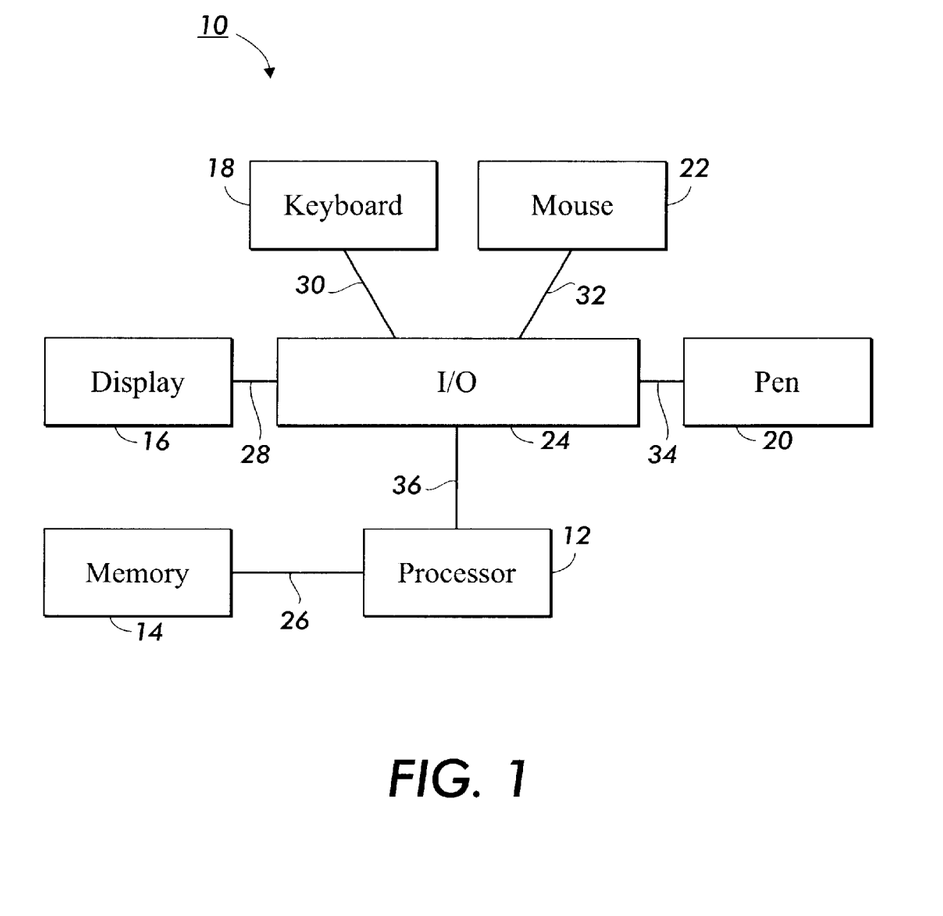
FIG. 1 is a block diagram of an embodiment of the electronic system of the present invention.

FIG. 1 shows an embodiment of an electronic system 10 of this invention. The electronic system 10 includes a processor 12 communicating with a memory 14 that stores the program, documents and other data for practicing the invention. The processor 12 also communicates with a display 16, a keyboard 18, a mouse 22 and a pen 20 via an input/output device 24. The keyboard 18, the mouse 22, the pen 20 and any other interface device (not shown) are operated by a user to control the operation of the electronic system 10. The display 16 may be on a stand-alone computer or a tablet connected by a tether to a conventional computer. The pen 20 may be a pen tablet, a pen display, a pen display tablet, a pen computer or any other pen based input device for receiving freeform digital ink.

As shown in FIG. 1, the system 10 is preferably implemented using a programmed general purpose computer. However, the system 10 can also be implemented using a special purpose computer, a programmed microprocessor or microcontroller and any necessary peripheral integrated circuit elements, an ASIC or other integrated circuit, a hard wired electronic or logic circuit such as a discrete element circuit, a programmable logic device such as a PLD, PLA, FPGA or PAL, or the like. In general, any device on which a finite state machine capable of implementing the flow chart shown in FIG. 5 can be used to implement the system.

Additionally, as shown in FIG. 1, the memory 14 is preferably implemented using static or dynamic RAM. However, the memory 14 can also be implemented using a floppy disk and disk drive, a writeable optical disk and disk drive, a hard drive, flash memory or the like. Additionally, it should be appreciated that the memory 14 can be either distinct portions of a single memory or physically distinct memories.

Further, it should be appreciated that the links 26, 28, 30, 32, 34 and 36 connecting the memory 14, the display 16, the keyboard 18, the mouse 22, the pen 20 and the input/output device 24 to the processor 12 can be wired or wireless links to networks (not shown). These networks can be local area networks, wide area networks, intranets, the Internet, or any other distributed processing and storage networks.

Figure 2:
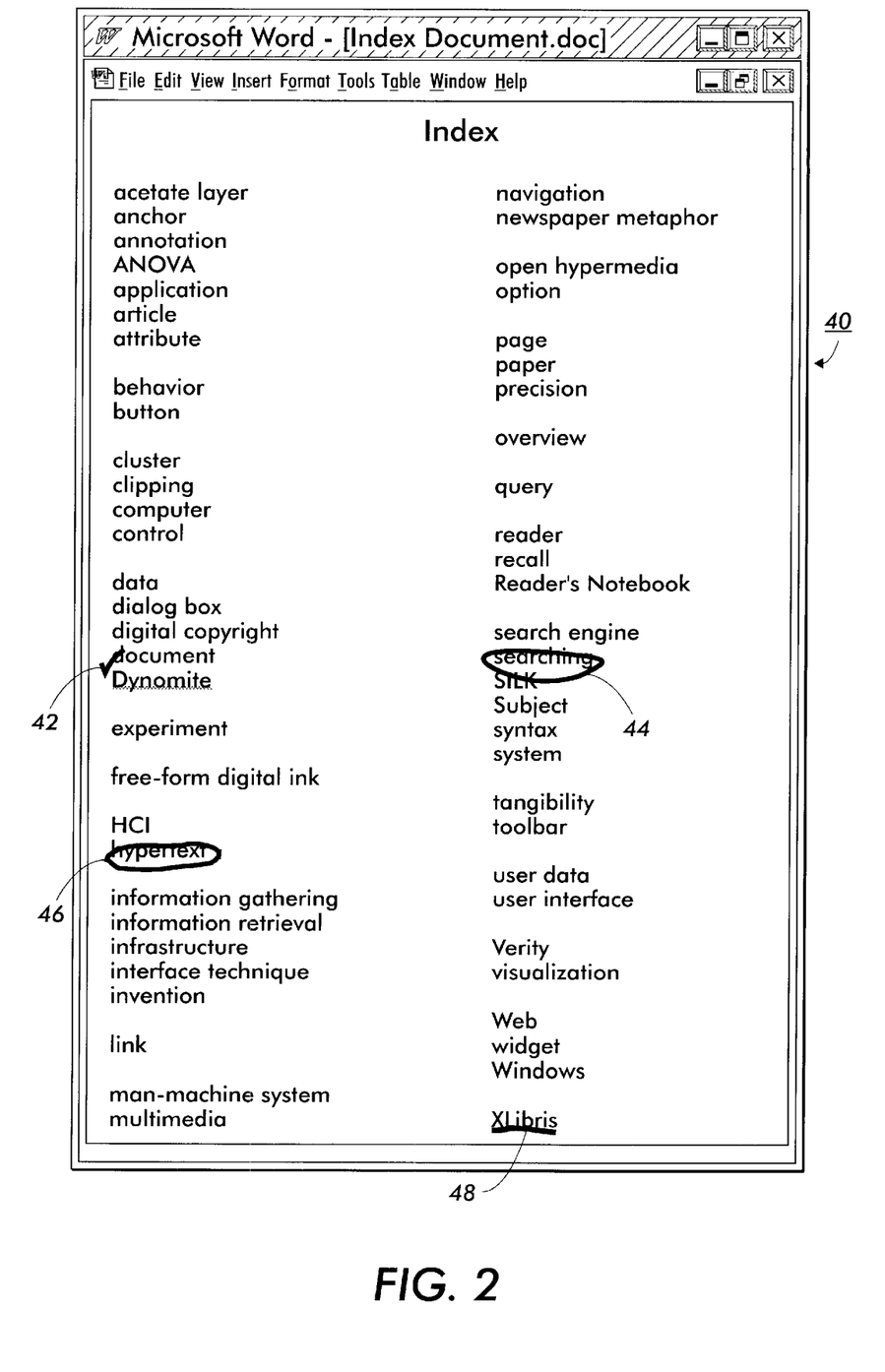
FIG. 2 is a view of an index with freeform digital ink marks.
Figure 3:
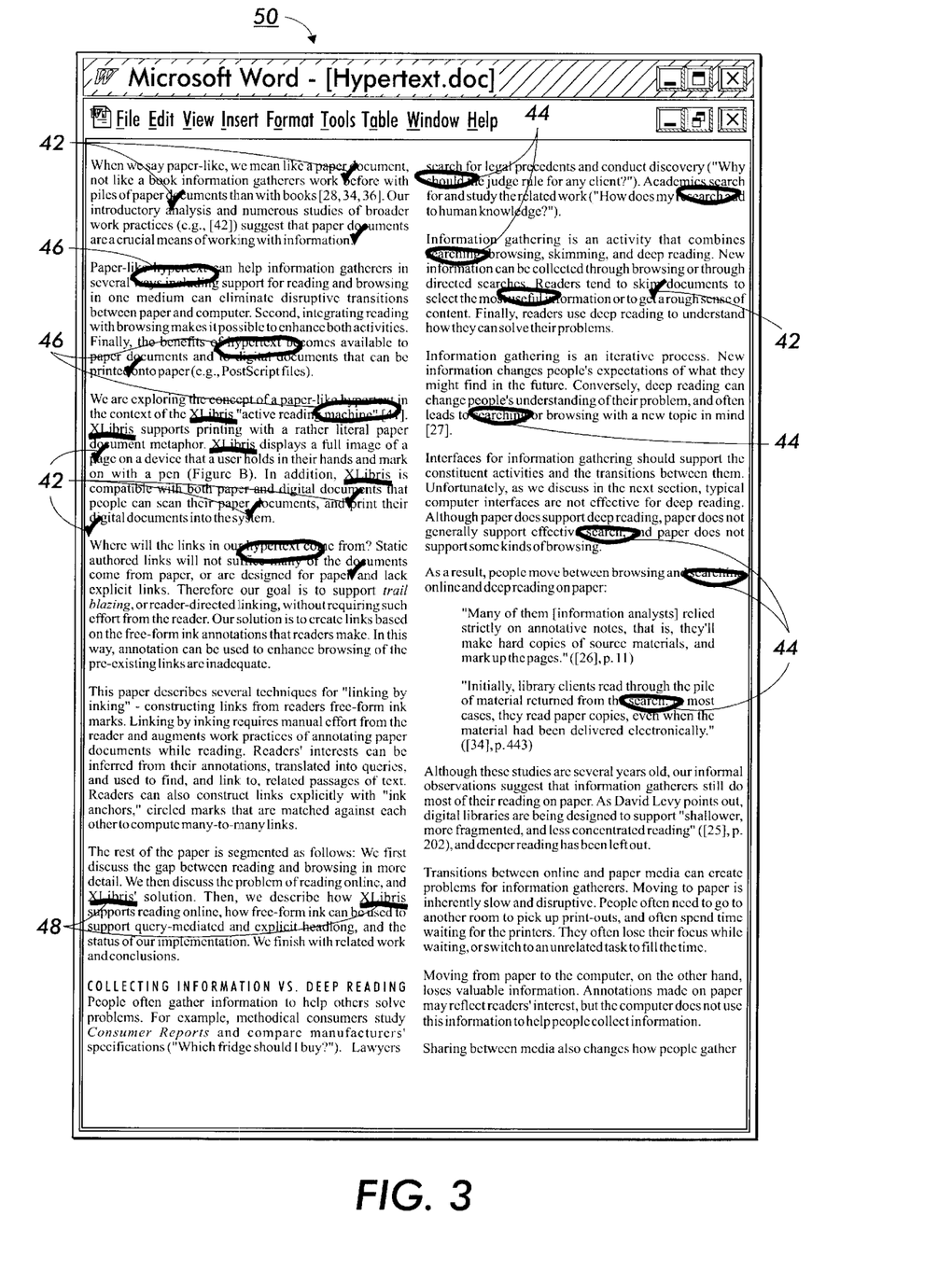
FIG. 3 shows a page of a document having instances of freeform digital ink marks placed on the terms in the document that correspond with the freeform digital ink marks on the index of FIG. 2 in accordance with an embodiment of the invention.

FIG. 2 shows an index page 40 with freeform digital ink marks 42, 44, 46 and 48. Each of these marks 42, 44, 46 and 48 are unique in that they each are formed from a freeform digital ink stroke that has a unique shape and/or other characteristic such as a color. The system and method of this invention map each freeform digital ink mark to a corresponding term in the index. The freeform digital ink mark is then used as a prototype and is instantiated for every occurrence of the corresponding term in the documents that are indexed. The freeform digital ink marks are then copied to the corresponding terms in the documents as if the user had annotated each term in its original context. The freeform digital ink marks 42, 44, 46 and 48 each appear in FIG. 3 on the corresponding terms in the document 50.

An embodiment of the system and method of this invention can be used with natural language, statistical, manual or any other techniques that generate indexes. These indexes may have maps from the terms in the index to the instances of those terms in the corresponding document. The system and method of this invention can copy the freeform digital ink marks from the terms in the index to the instances of the corresponding terms in the document by using the mapping provided by the indexing mechanism.

An embodiment of the system and method of this invention also distinguishes between instantiated freeform digital ink marks and regular freeform digital ink annotations. This distinction may or may not need to be provided to the user. However, one embodiment of the invention provides for a visual indication of this distinction. For example, one embodiment of the invention provides a small non-ink visual attribute such as a block "handle", that may be displayed for each instance. Selecting the handle causes the system to switch to the index page view for the term corresponding to the selected freeform digital ink mark.

Another embodiment of this invention distinguishes original freeform digital ink marks from instantiated freeform digital ink marks to provide different functions for the different types of marks. For example, when a user erases a freeform digital ink mark in the index then all corresponding instances of the freeform digital ink mark in the document are also removed. However, if a user erases an individual instance of the freeform digital ink mark in the document, the original freeform digital ink mark in the index is not affected. Additionally, if the user erases all instances of the freeform digital ink mark in the document, then the original freeform digital ink mark can be distinguished from the other original freeform digital ink marks by "graying out" or by removing the original freeform digital ink from the index.

Figure 4:
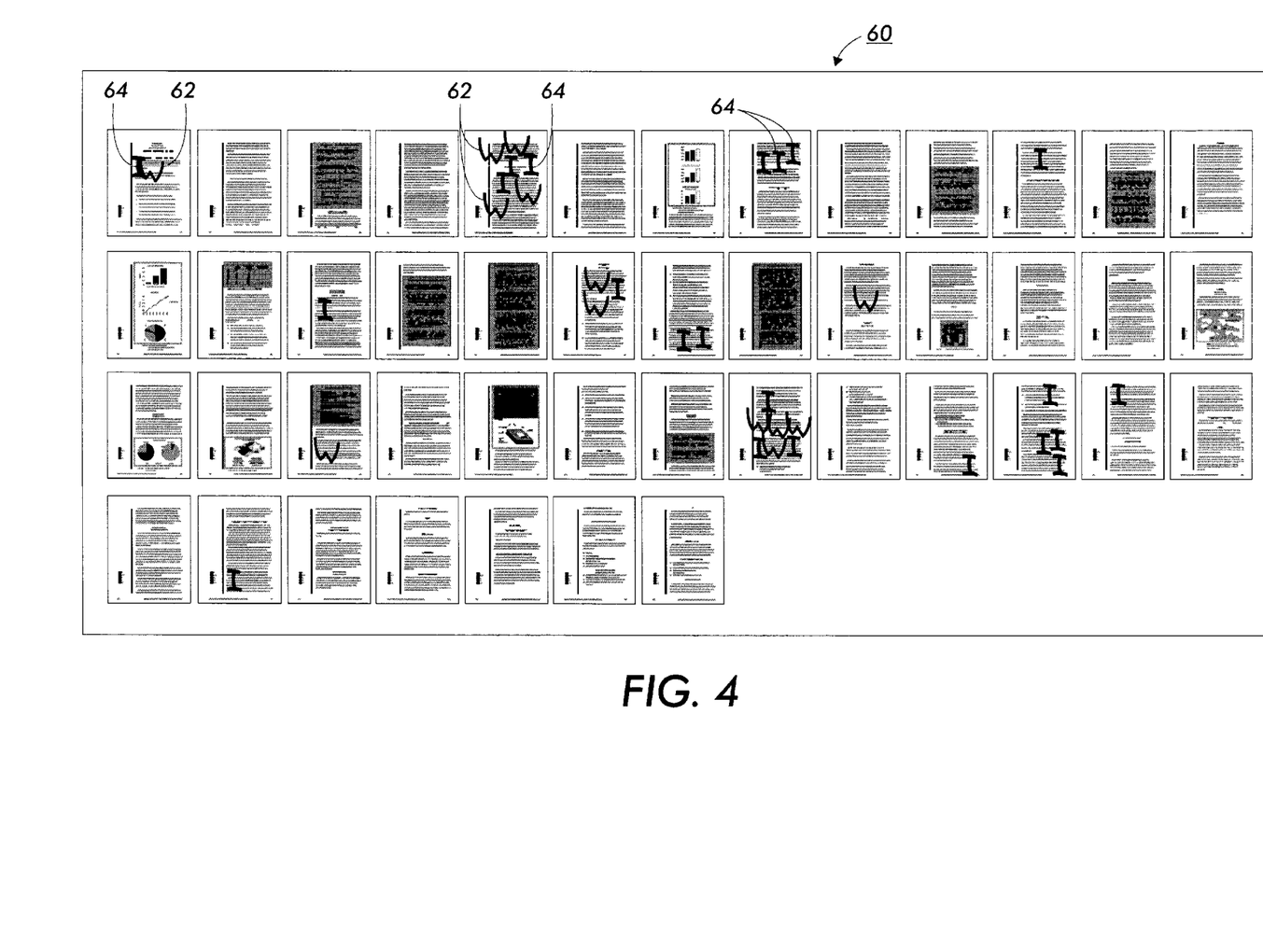
FIG. 4 is an overview of a document with thumbnail images of page that have freeform digital ink marks copied from an index of the document in accordance with an embodiment of the invention.

FIG. 4 shows an overview 60 of a document with thumbnail images of pages in the document with instantiated freeform digital ink marks 62 and 64. FIG. 4 shows that the instantiated freeform digital ink marks are visible and distinguishable from each other in the thumbnail views even though the corresponding terms are illegible.

An embodiment of the system and method of this invention treats the selection of multiple original freeform digital ink marks as a query that causes the system to display a ranked list of search results, where each item in the list is a passage that is relevant to the terms corresponding to the selected original freeform digital ink marks. This embodiment of the invention ranks the search results using traditional information retrieval measures such as the density of matching terms in a given passage. However, other types of similarity measures may also be used to rank the search results and the invention is not limited to any particular type of similarity measures.

Another embodiment of the system and method of the invention may be trained to define an ink query grammar that affects how the logic of a query is constructed from the index terms and from metadata. For example, the position, shape, type or other attribute of a user's marks can affect the formulation of a query. In the absence of a grammar, all selected terms are given equal weight in the query. However, if freeform digital ink marks are parsed, the user can specify advanced search features. An example of such an advanced feature determines which of the selected terms are mandatory. This example may be implemented by putting a freeform digital ink plus a sign, a star, or other mark by a term to determine which terms should occur in the results while using other freeform digital ink marks such as a cross-out to indicate which terms are not to occur in the results. Freeform digital ink marks that are not recognized as having a specific meaning will still select a term in the index but will not affect the logic of the search.

An embodiment of the system and method of the invention provides a perceptually-motivated model of freeform digital ink marks that applies higher weight to more saliently marked terms. For example, a user may choose to use digital ink that has a high salience such as a bright color and the system may apply a higher weight to the terms that are marked with this bright color digital ink than those terms that are marked with a less salient digital ink for the query. The search results will reflect the greater weight given to the terms marked with the high salience freeform digital ink.

While the detailed description describes copying freeform digital ink marks from an index to instances of the indexed terms in documents, it is to be understood that the method and system of the invention may also be applied to other applications. For example, the invention may be used for spreadsheets or graphs. These embodiments of the invention may permit a freeform digital ink mark on a cell in a table and copy the freeform digital ink marks to corresponding data points in a plot.

Another embodiment of the present invention permits freeform digital ink marking of a database visualization where the user annotates nodes using freeform digital ink on a database view and the embodiment copies the freeform digital ink marks to all corresponding points in the plot. Information retrieval of those visualizations may also benefit from the application of the present invention. For instance, a user may annotate a phrase in a document using freeform digital ink and the method and system of this invention would copy the freeform digital ink mark to points in the visualization that correspond to documents that are characterized by the marked phrase.

Yet another exemplary embodiment of this invention permits freeform digital ink marking on stock quotes in a scrolling view. The scrolling may stop temporarily to permit freeform digital ink annotation on a stock quote and/or identifier. The annotated stock quote then scrolls out of view. When the stock quote returns, this invention displays the associated freeform digital ink annotation on the stock quote.

Another exemplary embodiment of this invention permits freeform digital ink marking on a stock quote in a static view. When the stock quote appears in a separate scrolling view, the scrolling stock quote appears with the freeform digital ink annotation made in the static view.

Additionally, an embodiment of the present invention may be used to conduct a within-document search. For instance, a user may use freeform digital ink to mark a phrase and the embodiment would copy the freeform digital ink mark onto every instance of that phrase throughout the document. The user may be enabled to erase copies of the freeform digital ink mark on uninteresting occurrences of a phrase and the occurrences of the digital ink marks that remain may be presented in a summary format with appropriate context.

The present invention copies freeform digital ink marks on an object to corresponding objects. The invention may also copy freeform digital ink marks on an object to other objects which are related to the first object in some way. The copying action may be permitted to happen automatically with optional limitations to the type of freeform digital ink marks or the type of data. The copying may also be implemented in response to an explicit request from a user.

Figure 5:
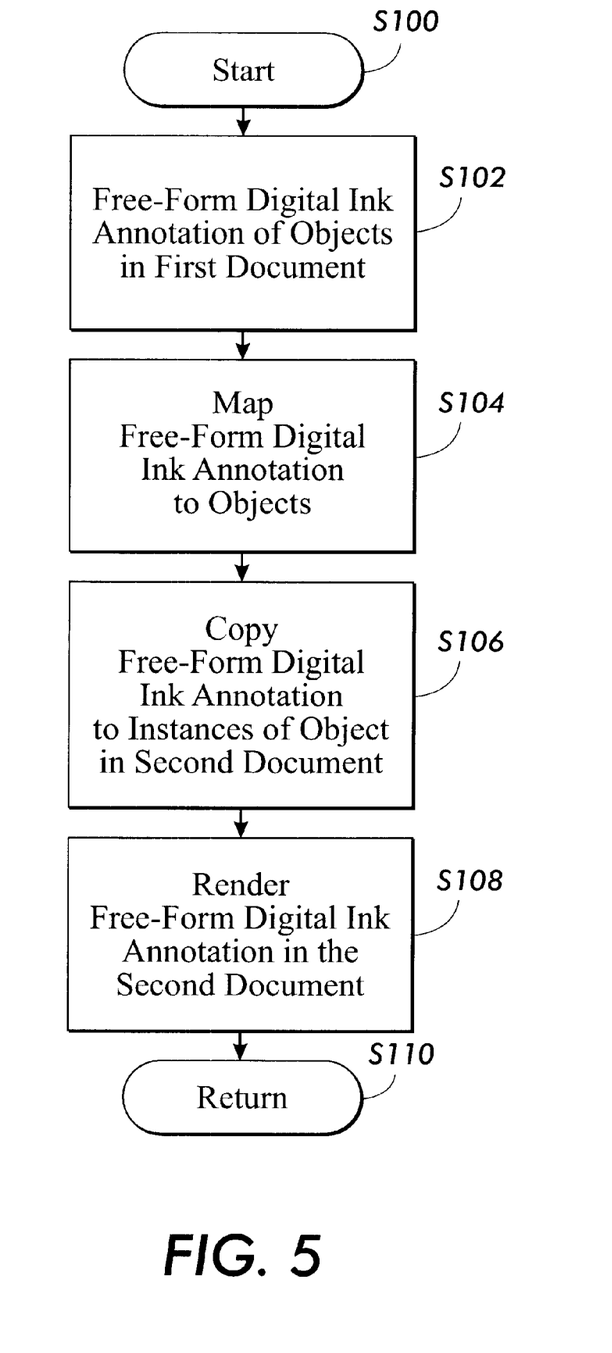
FIG. 5 shows a flow chart outlining a control routine for copying a freeform digital ink annotation on an object to a related object in accordance with an embodiment of the invention.

An exemplary embodiment of the method and the system of the invention use a control routine to copy a freeform digital ink mark on an object to a corresponding object that is outlined in a flow chart of FIG. 5. The control routine starts at step S100 and continues to step S102. In step S102 the control routine receives a freeform digital ink mark in a display of a document and continues to step S104. In step S104, the control routine computes a mapping between the freeform digital ink mark and an object in the display and under or near the mark and continues to step S106. In step S106, the control routine copies the freeform digital ink mark to corresponding instances of the object which match the object in some way and continues to step S108. One example provided by the control routine is by a query that is generated from the freeform digital ink marks. Another example is to copy the freeform digital ink mark to other objects that correspond logically to the first object. In step S108, the control routine then renders these marks in a view of the corresponding objects and continues to step S10. In step S10, the control routine returns control to the environment in which the control routine operates.

In an embodiment of the invention, a control routine may simply maintain a database of freeform digital ink marks and their correspondence to objects. Then, the embodiment may decide on its own or by a user request to generate a query using the database. The control routine would execute the query and render freeform digital ink marks on objects that match the query. Optionally, the query may be set to be reexecuted every time a view is changed.

An exemplary embodiment of the invention may also maintain an exclusion list. The exclusion list would include objects which are designated to not receive either particular freeform digital ink marks or any freeform digital ink marks. For example, a user may erase an annotation from an instance in a document. This embodiment then lists that instance in an exclusion list. All other instances that correspond to the prototype object receive a copy of the annotations except for the annotations in the exclusion list.

Freeform digital ink marks are intended to include visible ink strokes of an arbitrary shape that persist over time made with a pen, a mouse or other pointing device. The system of the invention may infer some meaning from the shape or morphological characteristic of the ink stroke but does not remove that stroke once it is recognized.

While the above description has generally referred to freefrom digital ink marks being made on an object, it is intended to be understood that the freeform digital ink marks are not required to be directly on the object being annotated. The method and system of this invention is equally applicable to any freeform digital ink mark that can be identified as being related to an object or objects. For instance, a freeform digital ink mark may be placed in a margin of a document and those objects that are in proximity to the mark may be identified as being related to the mark. This invention is equally applicable to all freeform digital ink marks that have relations with a corresponding object whether the relation is visible or invisible and/or expressed or implied or derived from any other relation measure now known or later developed.

It is to be understood that the term document is intended to include any plurality of data objects, such as text, video, audio and any other combination of media. Further, it is intended to be understood that the term object is intended to include any portion of text, digital ink, audio, video or any other component of document structure. Document structure including, by way of nonlimiting example, characters, words, phrases, sentences, paragraphs, sentences, or the like.

It is also to be understood that the term "copy" is intended to be an instance of a prototype annotation that, when viewed by a user, appears in a context that is different from the prototype.

It is also to be understood that while this invention has been described in terms of prototypes and instances as is known in computer programming languages that this invention is equally applicable to any objects that are related by any now known or later developed measure of similarity or relatedness between objects.

While the detailed description refers generally to electronic systems, it is intended to be understood that the method and system of the present invention may be applied to any electronic book or document reader (hereinafter referred to as an "e-reader"). E-readers include any electronic handheld device that can be accessed with a pointing device such as a pen or finger and that accepts freeform digital ink as input. Electronic book and document readers may also include other additional features without limitation.

While this invention has been described in conjunction with the specific embodiments outlined above, it is evident that many alternatives, modifications and variations are apparent to those skilled in the art. Accordingly, the preferred embodiments of the invention as set forth above are intended to be illustrative and not limiting. Various changes may be made without departing from the spirit and scope of this invention.

What is claimed is:

1. A system for copying at least one freeform digital ink mark made on at least one first object to at least one second object which is related to the at least one first object, the system comprising:
    a user interface for receiving the at least one freeform digital ink mark relative to the at least one first object;
    a processor that identifies the at least one second object as being related to the at least one first object; and
    a display that displays a copy of the at least one freeform digital ink mark relative to a display of the at least one second object, wherein the processor distinguishes between the at least one freeform digital ink mark relative to the first and second objects to provide different functions for each distinguished at lest one first and at least one second object.

2. The system of claim 1, the system being an e-reader.

3. The system of claim 1, the at least one first object being in a first plurality of objects and the at least one second object being in a second plurality of objects.

4. The system of claim 3, the first plurality of objects being an index to the second plurality of objects.

5. The system of claim 1, the at least one first object and the at least one second object being in the same plurality of objects.

6. The system of claim 1, the processor further being responsive to the receipt of an erase command by the user interface to delete the at least one freeform digital ink mark relative to the at least one first object.

7. The system of claim 6, the processor further being responsive to delete the copy of the at least one freeform digital ink mark on the at least one second object.

8. The system of claim 1, the processor further being responsive to the receipt of an erase command by the user interface to delete the copy of the at least one freeform digital ink mark relative to the at least one second object.

9. The system of claim 8, the processor further being responsive to delete at least one freeform digital ink mark on the at least one first object.

10. The system of claim 1, the processor further being responsive to the receipt of a command by the user interface to manipulate the at least one free form digital ink mark relative to the at least one first object.

11. The system of claim 10, the processor further being responsive to manipulate the copy of the at least one freeform digital ink mark relative to the at least one second object.

12. The system of claim 1, the processor further being responsive to the receipt of a command by the user interface to manipulate the copy of the at least one freeform digital ink mark relative to the at least one second object.

13. The system of claim 12, the processor further being responsive to manipulate the at least one freeform digital ink mark relative to the at least one first object.

14. The system of claim 1, the processor further identifying a context for the at least one second object and the display further displaying the context with a copy of the at least one freeform digital ink mark relative to the at least one second object.

15. The system of claim 14, the display displaying an ordered list of the at least one context.

16. The system of claim 14, the processor identifying the at least one context in the second plurality of objects that includes the at least one second object.

17. The system of claim 1, further comprising a map from the at least one first object to the at least one second object.

18. The system of claim 1, the user interface also for receiving freeform digital ink marks relative to other objects.

19. The system of claim 18, wherein the display distinguishes the copy of the at least one freeform digital ink mark relative to the at least one second object from freeform digital ink marks relative to other objects.

20. The system of claim 19, the distinction being a handle on the at least one freeform digital ink mark on the at least one second object.

21. The system of claim 20, the display being responsive to a selection of a handle to display the at least one freeform digital ink mark on the at least one first object.

22. The system of claim 19, the distinction being a difference in the perceptual salience of the digital ink of the freeform digital ink marks relative to other objects and the digital ink of the freeform digital ink marks relative to the at least one second object.

23. The system of claim 22, the perceptual salience being at least one of a color, brightness, saturation, size, thickness, opacity and texture.

24. The system of claim 1, the display also responsive to a user command to display a thumbnail image of a page in a document with the at least one second object with the at least one freeform digital ink mark relative to the at least one second object.

25. The system of claim 1, the processor identifying the at least one second object by being responsive to a selection of at least two freeform digital ink marks relative to at least two first objects to generate a query and to search for and identify the at least one second object using the query.

26. The system of claim 25, further comprising a grammar of freeform digital ink marks, the processor identifying the at least one second object by generating a query that is based upon the grammar.

27. The system of claim 26, the grammar at least partially based upon the salience of digital ink.

28. The system of claim 26, the grammar at least partially determining the query terms using a weighting system.

29. The system of claim 1, the at least one first object being a stock identifier in a scrolling display of stock identifiers and corresponding quotes and the at least one second object being a redisplay of the stock identifier.

30. The system of claim 1, the at least one first object being a stock identifier in a static display of stock identifiers and the at least one second object being in a scrolling display of stock identifiers.

31. A method for copying at least one freeform digital ink mark made relative to at least one first object to at least one second object which is related to the at least one first object, the method comprising:
    receiving the at least one freeform digital ink mark relative to the at least one first object;
    identifying the at least one second object as being related to the at least one first object;
    displaying a copy of the at least one freeform digital ink mark relative to the at least one second object, and distinguishing between the at least one freeform digital ink mark relative to the at least one first object and the at least one second object to provide different functions for each distinguished at least one first and at least one second object.

32. The method of claim 31, the at least one first object and the at least one second object being in one of an electronic book reader and electronic document reader.

33. The method of claim 31, the at least one first object being in a first plurality of objects and the at least one second object being in a second plurality of objects.

34. The method of claim 33, the first plurality of objects being an index of the second plurality of objects.

35. The method of claim 31, the at least one first object and the at least one second object being in the same plurality of objects.

36. The method of claim 31, further comprising:
receiving a freeform digital ink erase command to delete the at least one freeform digital ink mark relative to the at least one first object; and
deleting the at least one freeform digital ink mark relative to the at least one first object.

37. The method of claim 36, further comprising deleting the copy of the at least one freeform digital ink mark relative to the at least one second object.

38. The method of claim 31, further comprising:
receiving a freeform digital ink erase command to delete the copy of the at least one freeform digital ink mark relative to the at least one second object; and
deleting the copy of the at least one freeform digital ink mark relative to the at least one second object.

39. The method of claim 38, further comprising deleting the at least one freeform digital ink mark relative to the at least one first object.

40. The method of claim 31, further comprising:
receiving a command to manipulate the at least one freeform digital ink mark relative to the at least one first object; and
manipulating the at least one freeform digital ink mark relative to the at least one first object.

41. The method of claim 40, further comprising manipulating the copy of the at least one freeform digital ink mark relative to the at least one second object.

42. The method of claim 31, further comprising:
receiving a command to manipulate the copy of the at least one freeform digital ink mark relative to the at least one second object; and
manipulating the copy of the at least one freeform digital ink mark relative to the at least one second object.

43. The method of claim 42, further comprising manipulating the at least one freeform digital ink mark relative to the at least one first object.

44. The method of claim 31, further comprising:
identifying at least one context for the at least one second object; and
displaying the context with a copy of the at least one freeform digital ink mark relative to the at least one second object digital ink mark.

45. The method of claim 44, further comprising displaying an ordered list of the at least one context.

46. The method of claim 44, further comprising identifying the at least one context in the second plurality of objects that include the at least one second object.

47. The method of claim 31, the identifying based upon a map of the at least one first object to the at least one second object.

48. The method of claim 31, further comprising:
receiving at least one other freeform digital ink mark relative to at least one other object; and
displaying the at least one other freeform digital ink mark relative to the at least one other object.

49. The method of claim 48, wherein the displaying the at least one other freeform digital ink mark distinguishes it from the at least one freeform digital ink mark relative to the at least one second object.

50. The method of claim 49, wherein the step of displaying comprises displaying a handle on the at least one freeform digital ink mark relative to the at least one second object.

51. The method of claim 50, further comprising displaying the at least one freeform ink mark relative to the at least one first object and displaying the at least one first object in response to a selection of the handle.

52. The method of claim 49, wherein the step of displaying uses a difference in the perceptual salience of the at least one other freeform digital ink mark and the perceptual salience of the at least one freeform digital ink mark relative to the at least one second object.

53. The method of claim 52, the perceptual salience being at least one of a color, brightness, saturation, size, thickness, opacity and texture.

54. The method of claim 31, further comprising displaying a thumbnail image of a page containing the at least one second object with the at least one freeform digital ink mark relative to the at least one second object.

55. The method of claim 31, the identifying comprising,
generating a query in response to a selection of at least two freeform digital ink marks relative to at least two first objects;
searching a plurality of objects using the query; and
identifying the at least one second object using the query.

56. The method of claim 55, the query based upon a grammar of freeform digital ink marks.

57. The system of claim 56, the grammar at least partially based upon the salience of digital ink.

58. The method of claim 56, the grammar at least partially determining the query terms using a weighting system.

59. The method of claim 31, the at least one first object being a stock identifier in a static display of stock identifiers and the at least one second object being in a scrolling display of stock identifiers.

60. The method of claim 31, the at least one first object being a stock identifier in a scrolling display of stock identifiers and corresponding quotes and the at least one second object being a redisplay of the stock identifier.

* * * * *